Dec. 30, 1969     J. P. XENOS     3,487,395
PAPER FORM LOW LEVEL ALARM SYSTEM
Filed Aug. 12, 1966     2 Sheets-Sheet 1
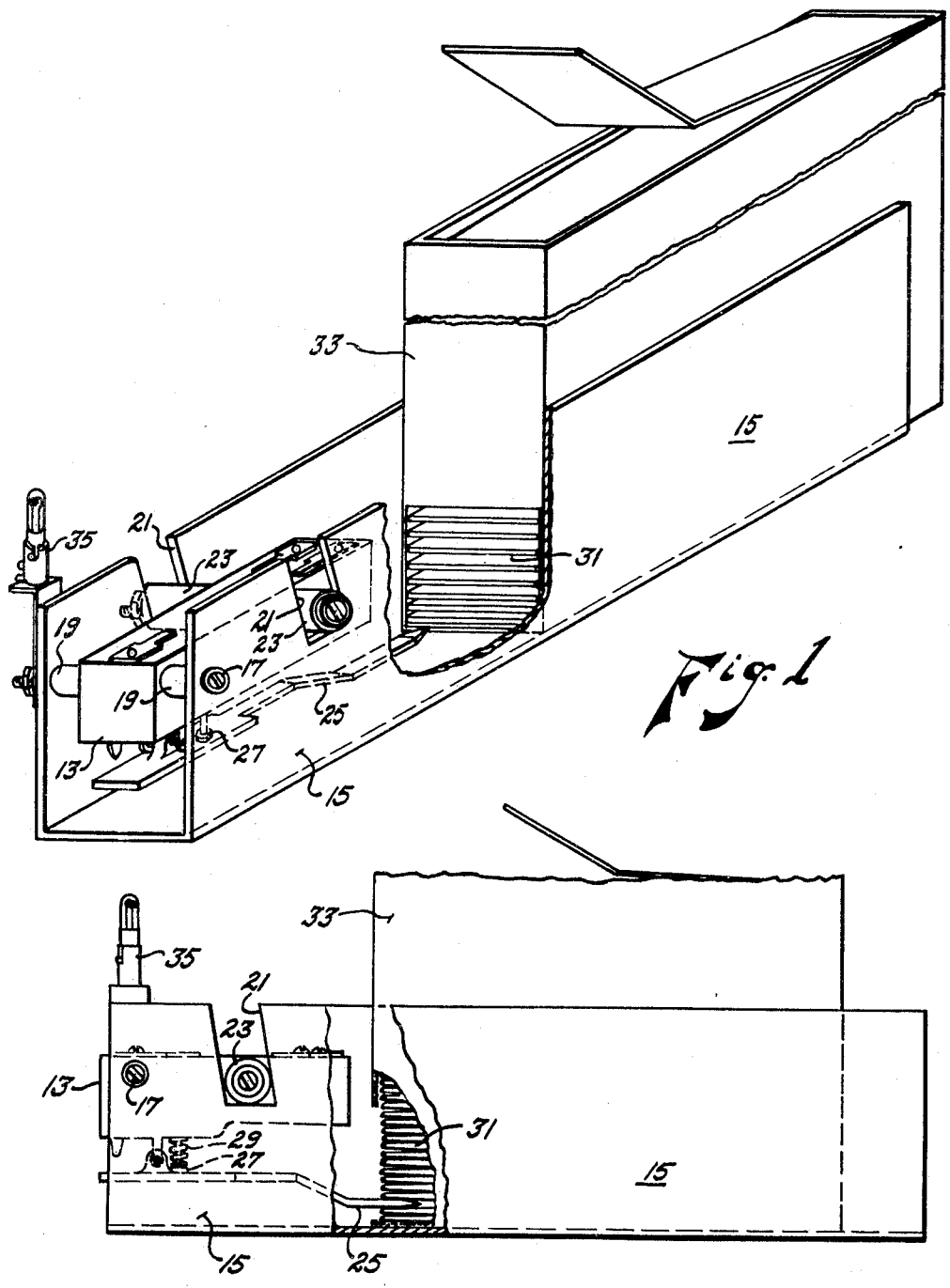
INVENTOR.
JOHN P. XENOS
BY Harry A. Herbert Jr
Arsen Tashjian and
ATTORNEYS Dec. 30, 1969  J. P. XENOS  3,487,395
PAPER FORM LOW LEVEL ALARM SYSTEM
Filed Aug. 12, 1966  2 Sheets-Sheet 2

INVENTOR.
JOHN B. XENOS
BY Harry A. Herbert Jr.
Arsen Tashjian and
ATTORNEYS

United States Patent Office 3,487,395
Patented Dec. 30, 1969

3,487,395
PAPER FORM LOW LEVEL ALARM SYSTEM
John P. Xenos, 211 Metropolitan Ave.,
Roslindale, Mass. 02131
Filed Aug. 12, 1966, Ser. No. 572,160
Int. Cl. G08b *21/00;* H01h *35/00*
U.S. Cl. 340—259
5 Claims

ABSTRACT OF THE DISCLOSURE

A paper form low level alarm system having a receptacle in which a supply of folded paper forms are held and a switch pivotally mounted on the receptacle in axial alignment with the paper form supply. A lever extends outwardly from the switch into the lower portion of the folds of the paper form supply. Movement of the lever relative to the switch is produced when the paper form supply reaches a predetermined low level thereby causing a warning alarm to be activated.

---

The invention described herein may be manufactured and used by or for the United States Government for governmental purposes without payment to me of any royalty thereon.

This invention relates to an alarm system for indicating a low level folded paper form condition and more particularly is concerned with providing an alarm system to indicate to the operator that a folded tape or paper form supply, such as used in computers and office equipment, is at a low level and requires replenishing.

Heretofore, in the operation of computers and related equipment which utilizes a folded tape or paper form supply which is out of sight of the operator, it was necessary for the operator to keep an accurate record of the amount of tape used, so that he would know when to replenish the supply. The alternative would be to check the tape level at frequent intervals requiring more or less constant attention on the part of the operator. Also, considerable time delay and trouble would result if the tape supply inadvertently ran out during a computer operation. To prevent this, the operators are frequently instructed to change the tape supply before it reaches a low level thereby resulting in the waste of a large amount of unused tape, sometimes amounting to 25 percent and more of the original supply.

Accordingly, it is an object of the present invention to provide means for indicating when the folded tape supply used in computers and other related equipment is at a low level particularly where the tape supply is out of sight of the equipment operator.

Another object of the invention is to provide a device which will eliminate the need for constantly checking the tape supply level thereby providing a more efficient and economical operating procedure for the operation of computers.

Still another object of the invention is to provide a foolproof warning system to indicate that the level of folded tape is in danger of becoming exhausted. This allows the operator of the equipment to stop and quickly install a new tape supply with a minimum interruption of the sequence of operations.

A still further object of the invention is to provide a device which is simple and easily constructed with a minimum of time and material and which prevents the waste of large amounts of unused folded tape by indicating the proper time and level at which to replace the supply.

These and other objects, features, and advantages, will become more apparent after considering the following detailed description taken in conjunction with the annexed drawings and appended claims.

In the drawings wherein like reference characters refer to like parts in the several views;

FIGURE 1 is a view in isometric of the trough with the tape box ready to be placed in operating position and partially cut away to show details of the microswitch arrangement;

FIGURE 2 is a side view of the switch in engagement with the folded tape in operating position;

Figure 3:
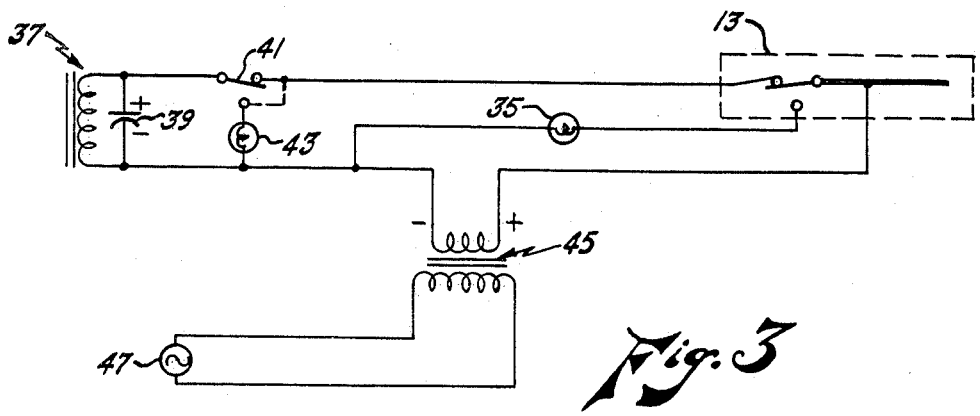
FIGURE 3 is a schematic diagram of the electrical connections of the alarm system according to the invention.

Referring now to the drawings, the invention includes a microswitch 13 pivotally mounted between the walls of the trough 15. The microswitch 13 is attached to the trough 15 by the screw member 17 which is partially tightened so that a frictional force is created by the spacers 19 mounted thereon between the walls of the trough 15 and the sidewalls of the microswitch 13. This arrangement allows the microswitch 13 to be adjusted to the desired angular position by pivoting on the mounting screw 17, thereby raising or lowering the forward portion of the microswitch 13. A pair of clearance slots 21 are formed in the walls of the trough 15 near the forward end of the body of the microswitch 13. Stop members 23 are fixedly attached to each side of the microswitch 13 and extend outwardly into the slots 21. If the microswitch 13 is pivoted so as to lower the forward portion an excessive amount, the stop members 23 engage the bottom of the clearance slots 21 and stop further downward pivoting movement thereby preventing possible damage to the system.

The switch lever 25, which is tapered at its forward end, controls the position of the button 27 and serves to make and break the circuital flow of current in the alarm system. A coil spring 29, shown dotted in FIGURE 2, is removed from beneath the button 27 to reduce the downward force of the lever 25 and prevent unnecessary drag on the folded tape 31. The on-off condition of the microswitch 13 is determined by the angular position of the lever 25 in relation to the body which in turn is controlled by pivoting the microswitch around the screw member 17 while the lever 25 is inserted between the folds of the folded tape supply 31. The box 33 in which the folded tape 31 is contained is cut away at the bottom of one end to expose the tape stored therein and, in the view of the alarm system as shown in FIGURE 1, the box 33 with the tape 31 therein is ready to be pushed forward in the trough 15 to engage the lever 25 of the microswitch 13. In FIGURE 2, the box 33 and tape 31 are in position ready for angular adjustment of the microswitch 13 so that the alarm will be given when the tape supply reaches a low point.

An indicator light 35 is attached to the side of the trough 15 near the microswitch 13 and light when the system is in operating condition by indicating the on-off condition of the microswitch 13. Thus, as the tape supply nears depletion, the folds under the switch lever 25 are removed causing the lever to pivot downward allowing button 27 to be released and change the conditions of the switch 13. In FIGURE 3, there is shown a schematic diagram of an electrical circuit which can be used to operate the alarm system according to the invention. As shown in FIGURE 3 the switch 13 is a single pole double throw type and is normally closed. When the switch 13 is in position for operation as shown in FIGURE 2 and pivoted downward until the button 27 throws the switch to the open position, the indicator light 35 lights to indicate that the alarm system is in "GO" position and when a sufficient amount of folded tape 31 is withdrawn from under the switch lever, 25, the switch 13 will return to its normally closed position causing the indicator light to go out and causing the buzzer 37 to sound an alarm. A capacitor 39 of 50 mfd. is installed across the buzzer 37 for purpose of damping to prevent transients from affecting the operation of the equipment upon which the alarm system is mounted. A toggle switch 41 is provided to open the circuit to the buzzer 37 while the microswitch 13 is being adjusted. A pilot light 43 when lighted indicates to the operator that the switch 41 is open and should be closed in order to activate buzzer 37. The energy to operate the various electrical components may be supplied from the transformer 45 which is energized by an alternating current source 47 or by a suitable direct current source (not shown).

Figure 4:
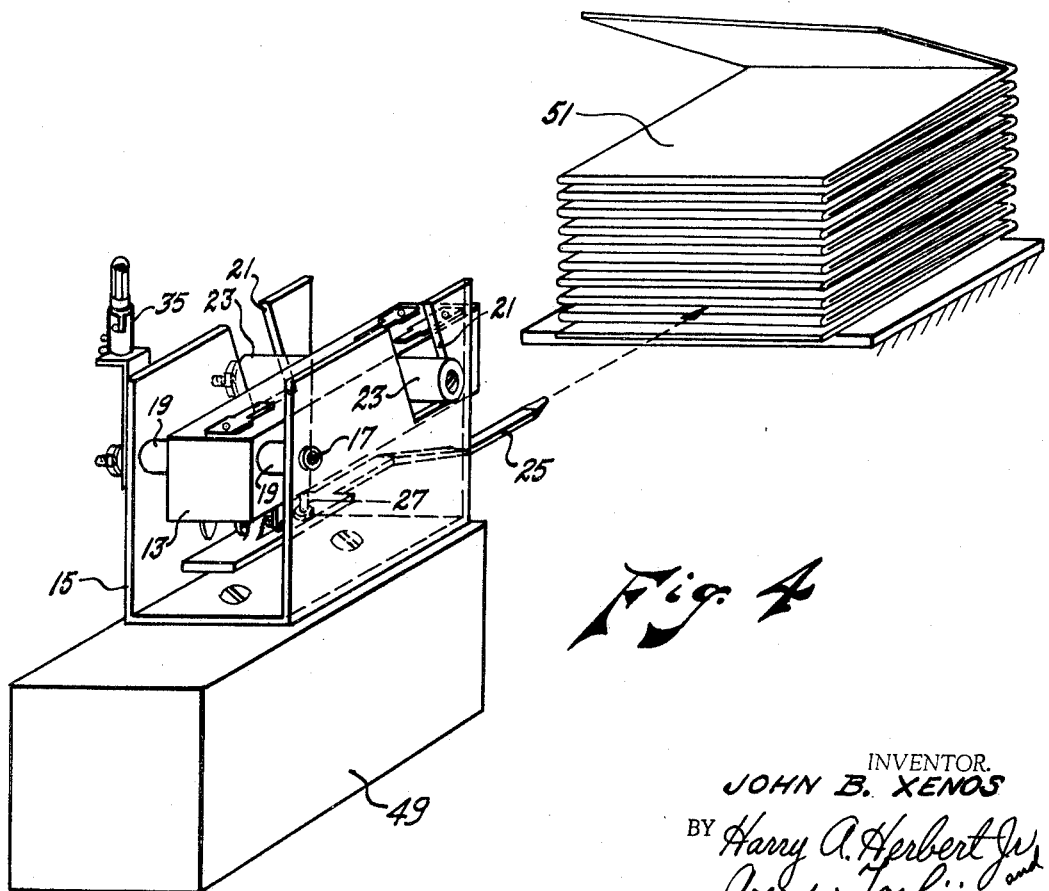
FIGURE 4 shows a portable alarm switch for use with any type of folded or stacked sheets or forms.

In the embodiment of the invention shown in FIGURE 4, a block 49 is provided to raise the switch 13 to a proper height to engage the folded forms 51. Since this arrangement is portable in nature, the alarm system can be easily adapted for use with most any type of folded forms or stacked sheets by simply attaching to a properly dimensioned block and inserting the switch lever 25 into the forms or sheets at the desired level.

In operation, an opening is cut in the lower section of one end of a box 33 of folded tape 31. The box 33 is then placed in the trough 15 with the cutaway portion nearest the lever 25 of the microswitch 13 and shifted forward until the lever 25 enters between the folds of the tape 31. The normally closed microswitch 13 with the lever 25 extending into the folded tape is pivoted downward until the indicator light 35 comes on to show that the microswitch 13 is now open and that the toggle switch 41 can be closed so that the buzzer 37 will sound when the switch 13 is closed. The alarm system is now ready for use to indicate when the level of the folded tape is low.

As the folded tape 31 is removed from the top of box 33 the level goes down until it reaches the area of the lever 25. The folds then begin to be drawn from under the lever 25 thereby releasing the button 27 and allowing the switch 13 to return to its normally closed position which activates the buzzer 37 indicating to the operator that the tape supply is at a low level. The buzzer 37 is silenced by throwing toggle switch 41 to the "off" position. The box of tape is then replaced with a full one and the alarm system is again attached to the new box in the manner hereinbefore described.

In certain instances it may be more desirable to provide a visual rather than an audible signal for indicating the low supply level of folded forms or tape. An alternative circuit to that shown in FIGURE 3 may be used wherein the elements 37, 39 and 41 are eliminated and one terminal of the pilot lamp 43 is connected directly to the normally closed terminal of microswitch 13. With this arrangement, which is shown dotted in FIGURE 3, the light 43 goes on when the switch 13 returns to its normally closed condition thereby indicating to the operator that the paper form supply is at a low level and needs replenishing.

Having thus set forth and disclosed the nature of my invention, what I claim is:

1. An alarm system for indicating the low level of paper forms supplying a computer and the like, said system comprising a receptacle for holding a supply of folded paper forms therein, a switch pivotally mounted on said receptacle and in axial alignment with said supply of folded paper forms, a lever extending outwardly from said switch and inserted between the lower portion of the folds of said supply of forms, the movement of said lever relative to said switch causing said switch to open and close, and means responsive to the condition of said switch for indicating the position of said lever corresponding to the level of folded form supply, said indicating means producing an alarm for warning the operator of the computer of the low level of paper form supply.

2. The alarm system defined in claim 1 wherein the means for indicating the low level of paper form supply includes an audible signalling device electrically connected to said pivotally mounted switch so as to respond to the condition thereof by making a sound.

3. The alarm system defined in claim 1 wherein the means for indicating the low level of paper form supply includes a visual signalling device electrically connected to said pivotally mounted switch so as to respond to the condition thereof by becoming lighted.

4. The alarm system defined in claim 1 wherein the pivotally mounted switch on said receptacle is adjustable relative to said receptacle, said adjustment determining the position at which said lever is inserted into the folds of said paper form supply thereby specifying the level at which said indicating means produces the warning alarm.

5. The alarm system defined in claim 1 wherein the pivotally mounted switch is fixedly attached to a supporting member, said switch and associated supporting member being portable for use with folded paper forms separately positioned therefrom.

References Cited

UNITED STATES PATENTS

| | | | |
|---|---|---|---|
| 2,512,573 | 6/1950 | Walters | 340—259 X |
| 3,246,313 | 4/1966 | Weaklend | 340—246 |
| 3,267,453 | 8/1966 | Braun | 340—259 |

JOHN W. CALDWELL, Primary Examiner

PERRY PALAN, Assistant Examiner

U.S. Cl. X.R.

200—61.2